US008843725B2

(12) United States Patent
Starr et al.

(10) Patent No.: US 8,843,725 B2
(45) Date of Patent: Sep. 23, 2014

(54) VIRTUAL INTERCHANGEABLE STORAGE DEVICE

(75) Inventors: Matthew Thomas Starr, Lafyette, CO (US); Richard Douglas Rector, Arvada, CO (US); Nathan Christopher Thompson, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 1742 days.

(21) Appl. No.: 11/230,146

(22) Filed: Sep. 19, 2005

(65) Prior Publication Data

US 2007/0067555 A1 Mar. 22, 2007

(51) Int. Cl.
G06F 12/00 (2006.01)
G06F 13/00 (2006.01)
G06F 13/28 (2006.01)
G06F 3/06 (2006.01)

(52) U.S. Cl.
CPC ............ G06F 3/0631 (2013.01); G06F 3/0686 (2013.01); G06F 3/0605 (2013.01)
USPC ............... 711/200; 711/2; 711/111; 711/114; 711/161; 711/162; 711/173; 711/202; 711/203; 711/201

(58) Field of Classification Search
USPC ......... 711/114, 111, 161–162, 202–203, 173, 711/2, 11
See application file for complete search history.

(56) References Cited

U.S. PATENT DOCUMENTS

| 5,455,926 | A * | 10/1995 | Keele et al. ....................... 711/4 |
| 6,324,497 | B1 | 11/2001 | Yates et al. |
| 6,725,394 | B1 | 4/2004 | Bolt |
| 7,454,565 | B1 * | 11/2008 | Justiss et al. ................... 711/114 |
| 2002/0161596 | A1 | 10/2002 | Johnson et al. |
| 2004/0025165 | A1 | 2/2004 | Desoli et al. |
| 2004/0105187 | A1 | 6/2004 | Woodruff et al. |
| 2004/0111251 | A1 | 6/2004 | Trimmer et al. |
| 2004/0153614 | A1 * | 8/2004 | Bitner et al. ................... 711/162 |
| 2004/0177228 | A1 * | 9/2004 | Leonhardt et al. ............ 711/170 |
| 2004/0223253 | A1 | 11/2004 | Woodruff et al. |

(Continued)

OTHER PUBLICATIONS

U.S. Appl. No. 10/950,613, Starr et al.

(Continued)

Primary Examiner — Yaima Rigol

(74) Attorney, Agent, or Firm — Kenneth Altshuler

(57) ABSTRACT

Disclosed is a method and apparatus for a storage system comprising at least one mobile random access storage device capable of storing first or second data. At least one docking station is associated with an address wherein the address is identifiable by at least one host computer. A first and second sub-address is associated with the at least one docking station wherein the first and second sub-addresses are identifiable by the at least one host computer. The first sub-address corresponds to a first virtual device adapted for storing the first data on a first virtual media. The second sub-address corresponds to a second virtual device adapted for storing the second data on a second virtual media wherein the second virtual media is a different media type from the first virtual media. The at least one docking station is adapted to be responsive to the at least one host computer as available for storing the first data at the first sub-address or the second data at the second sub-address when the at least one docking station is operatively linked with the at least one mobile random access storage device.

21 Claims, 15 Drawing Sheets

(56) References Cited

U.S. PATENT DOCUMENTS

| | | |
|---|---|---|
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0015713 A1 | 1/2005 | Plastina et al. |
| 2005/0033758 A1 | 2/2005 | Baxter |
| 2005/0033911 A1* | 2/2005 | Kitamura et al. ............. 711/111 |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/126,025, Rector et al.
U.S. Appl. No. 11/123,725, Rector et al.
U.S. Appl. No. 11/145,768, Downey et al.
U.S. Appl. No. 11/240,893, Starr et al.
U.S. Appl. No. 11/264,920, Lantry et al.
PCT Application No. US05/45168, Spectra Logic Corporation.
PCT Application No. US05/46447, Spectra Logic Corporation.
International Publication No. WO 2005/010661 A2, Feb. 3, 2005, Spectra Logic Corporation.

* cited by examiner

VIRTUAL INTERCHANGEABLE STORAGE DEVICE

CROSS-REFERENCE TO RELATED APPLICATIONS

None.

FIELD OF THE INVENTION

The present invention relates generally to virtually changing a mobile random access storage device to an alternative storage device capable of storing received data intended for the alternative storage device.

BACKGROUND

Tape libraries have historically been the primary storage devices for amassed digital data. This has been due in part because of the tape libraries' ability to store considerably large amounts of data in a cost-efficient and data-stable manner. Other types of storage systems containing alternative media such as disc drives, optical storage systems and flash memory, however, are gaining momentum as a consequence of advancements and relative cost improvements in random access storage technology. These alternative storage systems take advantage of random access memory storage functionality which can dramatically speed up data transfer between a host and storage system.

Generally, a host computer is adapted to store, retrieve, and manipulate data with specific types of storage systems comprising specific types of storage devices operable to manage data on specific types of storage media. Such storage operations are typically accomplished by using a specific data storage protocol compatible with a specific type of storage system. For example, if a host computer is adapted to store data in a tape library, communication and data transfer between the tape library and the host is typically accomplished by a tape library protocol. Some storage systems leveraging disc drive storage technology are configured to emulate a tape library and store data received from the host as if they were a tape library using the tape library protocol. Such advances are evident in a Virtual Tape Library (VTL) which is a leading alternative to the traditional tape library.

Though systems like VTLs have virtues such as improved data transfer speed and redundant storage backup using RAID, they are often limited to a fixed storage capacity, unlike the tape libraries which can use a mobile, restorable supply of tape cassettes. In addition, storage systems, such as the VTL, are further restricted to a specific data storage protocols for storing data.

In an effort to provide an improvement in versatility for storing and retrieving data with a host computer coupled with replenishable storage capacity, both methods and apparatus are proposed herein. It is to innovations related to this subject matter that the claimed invention is generally directed.

SUMMARY OF THE INVENTION

The present invention relates generally to virtually changing a mobile random access storage device to an alternative storage device and overcomes the disadvantages and limitations of the prior art by providing a method and apparatus for receiving and storing data intended for the alternative storage device.

Embodiment of the present invention can therefore comprise a storage system comprising: at least one mobile random access storage device capable of storing first and second data; at least one docking station associated with an address that is identifiable by at least one consumer of data; a first sub-address and a second sub-address associated with the at least one docking station that are each identifiable by the at least one consumer of data; the first sub-address corresponding to a first virtual device adapted for storing the first data on a first virtual media; the second sub-address corresponding to a second virtual device adapted for storing the second data on a second virtual media wherein the second virtual media is a different media type from the first virtual media; and the at least one docking station adapted to be responsive to the at least one consumer of data as being available for storing the first data at the first sub-address or the second data at the second sub-address when the at least one docking station is operatively linked with the at least one mobile random access storage device.

Another embodiment of the present invention can therefore comprise a method for saving information in a storage system comprising: receiving an inquiry from a first consumer of data; providing a first address associated with a first docking station; providing a first sub-address corresponding to a first virtual device adapted for storing first data on a first virtual media and a second sub-address corresponding to a second virtual device adapted for storing second data on a second virtual media wherein the second virtual media is a different media type than the first virtual media and wherein the first and second sub-addresses are associated with the first address; operatively linking a first mobile random access storage device with the first docking station; designating the first mobile random access storage device as the first virtual device; responding to the first consumer of data that the first virtual device at the first sub-address is available for storing first data; storing the first data received from the first consumer of data at the first sub-address on the first mobile random access storage device.

Yet another embodiment of the present invention can therefore comprise a system for saving information in a storage library comprising: means for receiving an inquiry from a first consumer of data; means for providing a first address associated with a first docking station; means for providing a first sub-address corresponding to a first virtual device adapted for storing first data on a first virtual media and a second sub-address corresponding to a second virtual device adapted for storing second data on a second virtual media wherein the second virtual media is a different media type than the first virtual media and wherein the first and second sub-addresses are associated with the first address; means for operatively linking a first mobile random access storage device with the first docking station for operability; means for designating the first mobile random access storage device as the first virtual device; means for responding to the first consumer of data that the first virtual device at the first sub-address is available for storing first data; means for storing the first data received from the first consumer of data at the first sub-address on the first mobile random access storage device.

Yet another embodiment of the present invention can therefore comprise a storage system comprising: at least one mobile random access storage device capable of storing data; at least one docking station adapted to receive and transmit the data; the at least one mobile random access storage device adapted to be designated to function as a first or a second virtual of storage device wherein the second virtual storage device is a different type of device from the first virtual storage device; the mobile random access storage device capable of storing the data intended for storage on the first virtual storage device when the at least one mobile random access storage device is designated as the first virtual storage device and the at least one mobile random access storage device is operatively linked with the at least one docking station.

Yet another embodiment of the present invention can therefore comprise a storage system comprising: at least one mobile random access storage device capable of storing sequential data and random data; at least one docking station; the at least one docking station associated with an address wherein the address is identifiable by at least one consumer of data; a first and second sub-address associated with the docking station wherein the first and second sub-addresses are identifiable by the at least one consumer of data; the first sub-address corresponding to a virtual sequential storage device adapted for storing the sequential data on a virtual sequential storage media; the second sub-address corresponding to a virtual random storage device adapted for storing the random data on a virtual random storage media; and the at least one docking station adapted to be responsive to the at least one consumer of data as available for storing the sequential data at the first sub-address or the random data at the second sub-address when the at least one docking station is operatively linked with the at least one mobile random access storage device.

DETAILED DESCRIPTION

Figure 1:
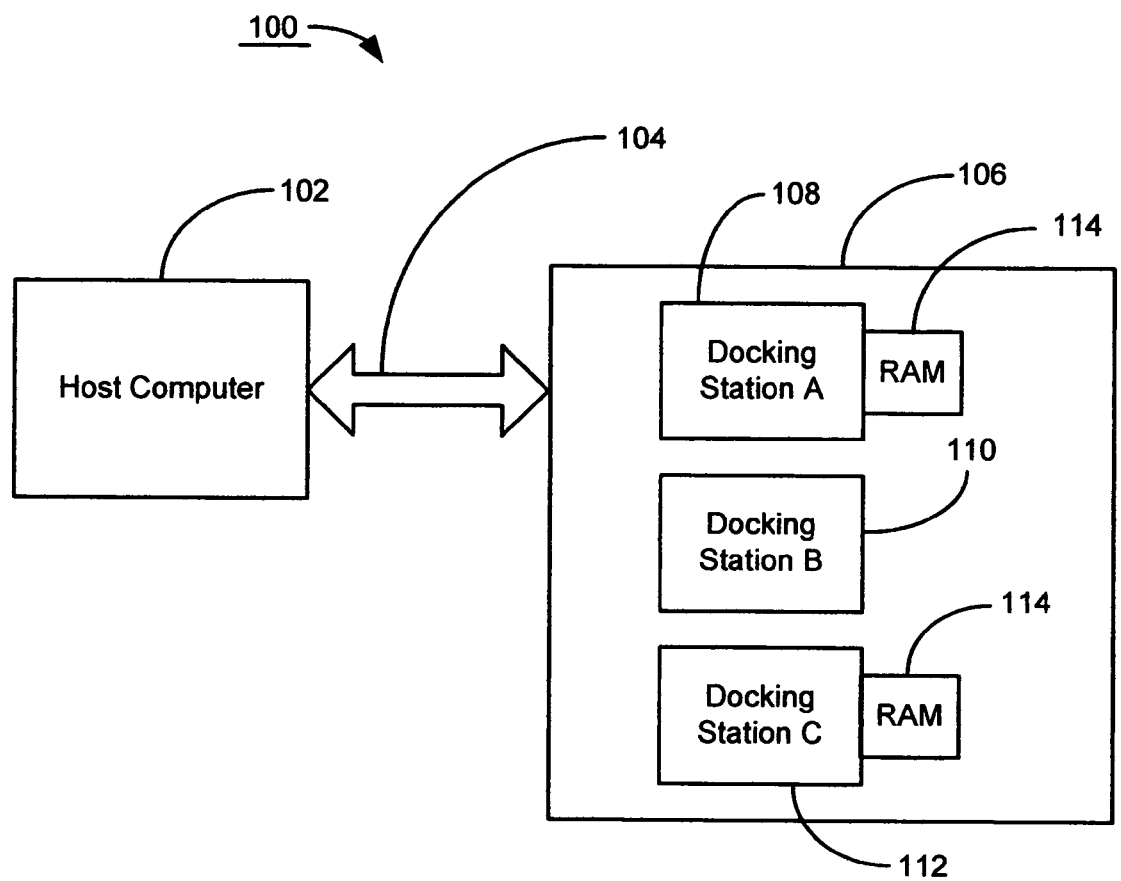
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a storage system 106. A host computer 102 is one embodiment of a consumer of data; other embodiments can also include another storage system 106 or a streaming output device such as a video server, just to name several examples. A consumer of data is an entity, or entities, that is capable of "taking in" data, for example a host computer 102 is a consumer when receiving data and a storage system 106 is a consumer when receiving data. As one skilled in the will appreciate, in addition to "taking in" data, a consumer of data is also generally capable of transmitting data. The host computer 102 can be a personal computer, a main frame computer, a server, or any computer system capable of communication with the storage system 106, just to name a few examples. The communication path 104, at a minimum, needs only to facilitate communication between the host computer 102 and the storage system 106. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path can be in the form of a wire line pathway, wireless, or a combination thereof, for example.

The storage system 106 is capable of storing and retrieving data for the host 102 by means of using at least one docking station, such as docking station A 108, docking station B 110 and docking station C 112. Docking stations A 108 and C 112 are each operatively linked with a mobile Random Access Memory (RAM) device 114, wherein the mobile RAM devices 114 are adapted to store data received from the host computer 102 via the docking stations. A RAM device is capable of storing random data, that is data that is not constrained by a linear format such as tape for example. In one embodiment, a mobile RAM device 114 can be inserted in the docking station, such as docking station A 108; however the Mobile RAM device 114 need only be operatively linked to a docking station to store data received via the docking station. Docking station B 110 is not operatively linked with a mobile RAM device 114 and hence is unable to store data received beyond any storage capacity docking station B 110 may comprise, such as Dynamic RAM for example. For purposes of illustration, communication with the storage system 106 is considered communication with the storage system 106 generally and/or communication directly with components that comprise the storage system 106. A docking station, such as docking station A 108, is an apparatus that is capable of coupling with a mobile RAM device, such as mobile RAM device 1114, for storage operations. Several examples of a docking station include a USB port capable of receiving a USB device, a PCMCIA slot for receiving a PC-card, a disc drive or disc drive magazine receptacle, serial port connection, parallel port connection, or any other such apparatus capable of transmitting and receiving data to a storage device via wire line or wireless just to name several examples.

Figure 2:
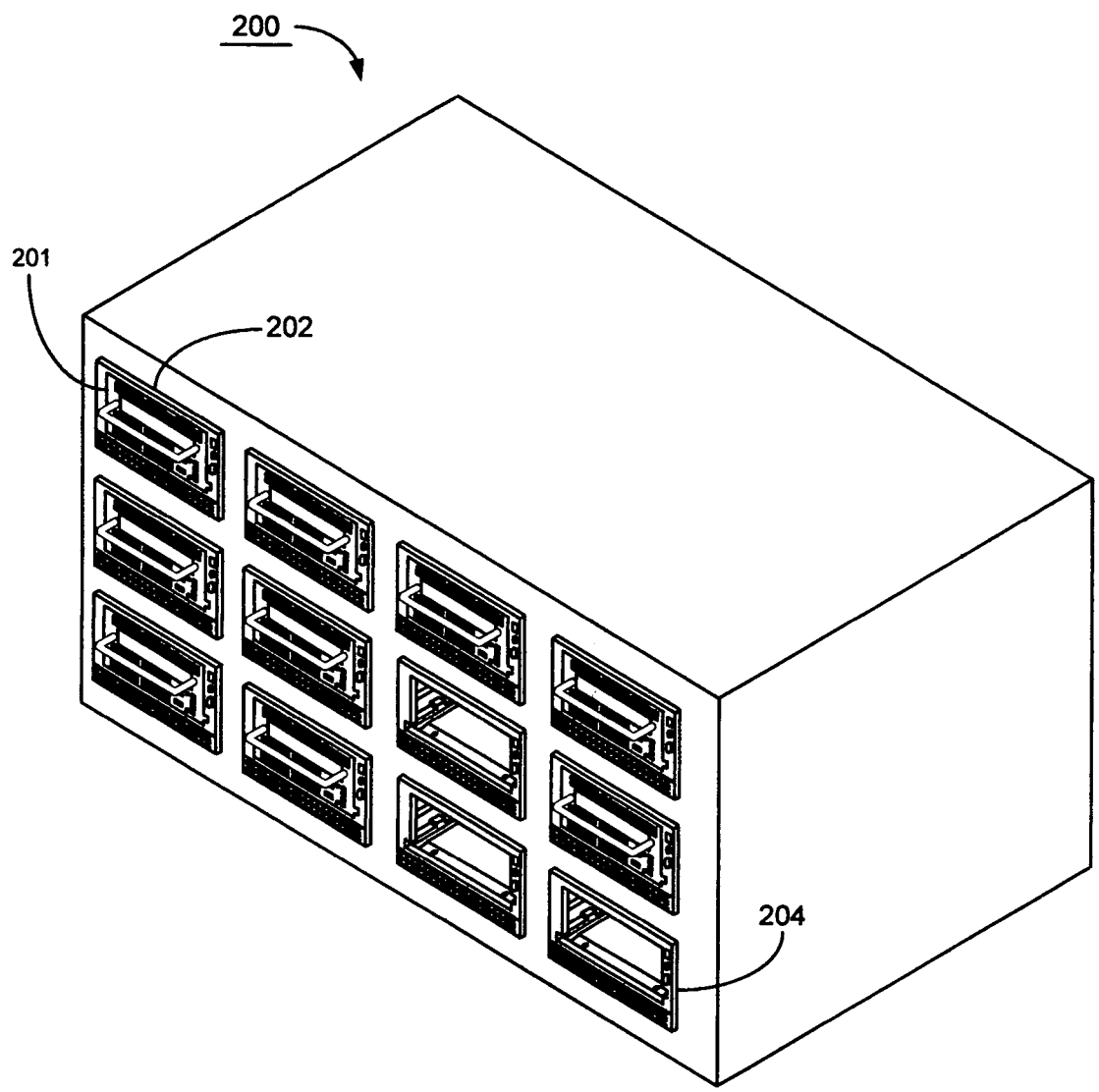
FIG. 2 shows an example of a storage system wherein the present invention can be practiced in accordance with some embodiments of the present invention.

FIG. 2 shows an example of a storage system 106 in accordance with one embodiment of present invention. Here, an RXT Bank of Drives disc drive magazine library 200 from Spectra Logic Corp. of Boulder, Colo. comprises a plurality of random access memory devices (in this example disc drive magazines 201) and docking stations 202 operatively linked to one another to function as the RXT library 200. The disc drive magazines 201 are adapted for mobility, and can be removed from or inserted into a docking station 202, as illustrated by a vacant docking station 204 capable of receiving a disc drive magazine 201, for example. The RXT library 200 is capable of communicating with a host, such as the host 102, via a sequential storage protocol, such as a tape library protocol used for streaming data to store on tape medium for example.

Figure 3:
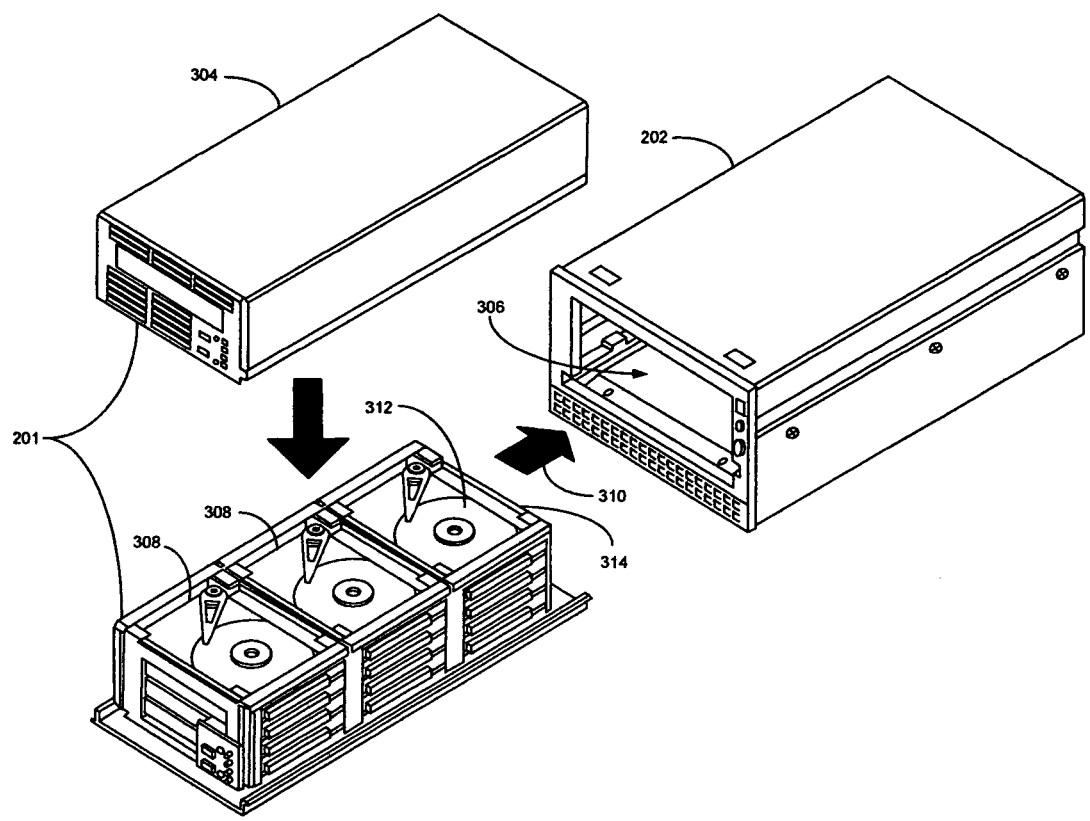
FIG. 3 shows an illustration of an embodiment of an RXT disc drive magazine and docking station wherein the present invention can be practiced in accordance with some embodiments of the present invention.

FIG. 3 shows a more detailed illustration of an embodiment of an RXT disc drive magazine 201 and docking station 202. Here, a plurality of disc drives 308 are shown substantially contained by an enclosure 304 generally comprising the mobile disc drive magazine 201. A conventional magnetic disc drive 308 is only one embodiment of a RAM device according to the present invention, which, in further embodiments, can include flash memory or optical memory, just to name a few (see below). The illustrative mobile disc drive magazine 201 is adapted to be received by an opening 306 in the docking station 202 as shown by the arrow 310. While the docking station 202 is shown as one of a number of stations in the library 200, one of ordinary skill will appreciate that the docking station 202, by itself, could be used as a stand-alone storage system. The engaging surface 314 of the mobile disc drive magazine 201 is adapted with electrical contacts (not shown) to contact with complementary electrical contacts (not shown) on the engaging surface (not shown) of the docking station 202. When contact is made, the RXT disc drive magazine 201 is considered operatively linked with the docking station 202 whereby the transmission of data can occur between the docking station 202 and the mobile disc drive magazine 201. Furthermore, power can be optionally provided to the mobile disc drive magazine 201 by the docking station 202. Power and data transmission provide a cooperatively linked state between the mobile disc drive magazine 201 and the docking station 202. The docking station 202 is capable of being communicatively connected with a host computer, such as the host computer 102, or other storage device/s, such as the RXT storage library 200 for example, by a coupling means, such as wires, plugs-in, wireless transmission (e.g., IR, RF) or any combination or equivalence thereof. By linking the docking station 202 with the storage system 200, a connected disc drive magazine 201 is effectively in a cooperatively linked state with the storage system 200.

While the claimed invention has utility in any number of different applications, the RXT disc drive magazine library 200 has been provided to illustrate a suitable environment in which the claimed invention can be practiced. Here, the disc drive magazine 201 is an embodiment of a RAM device, such as RAM device 114. Other RAM devices can include a Compact Disc Read Only Memory (CDROM) for use with a Compact Disc (CD) or other optical storage media, magneto optical systems, disc drive, disc drive magazine comprising multiple disc drives, flash memory devices (such as a compact flash), floppy disc drive systems, and RAM semiconductor memory (i.e., an SDRAM, for example).

Figure 4A:
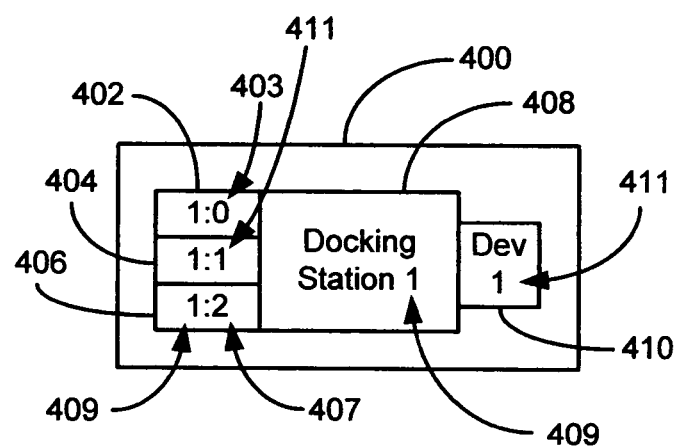
FIGS. 4A and 4B are block diagrams showing virtual storage devices with respective virtual media associated with a docking station consistent with some embodiments of the present invention.
Figure 4B:
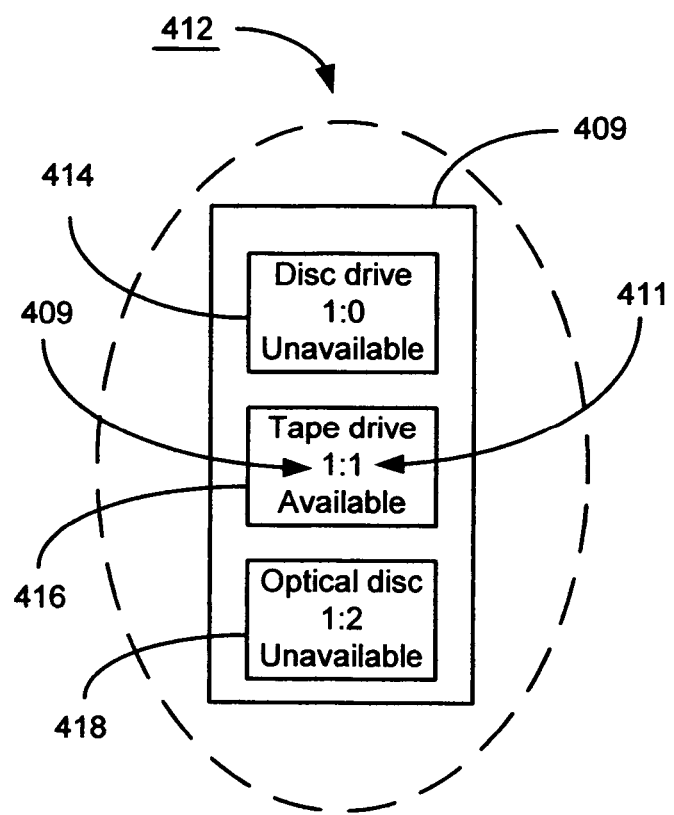

FIGS. 4A and 4B are block diagrams showing virtual storage devices with respective virtual media 412 associated with a docking station 408 consistent with an embodiment of the present invention. Referring to FIG. 4A, a storage system 400 comprises docking station [1] 408 wherein docking station [1] 408 is associated with address [1] 409. Docking station [1] 408 further comprises three sub-addresses, shown herein as [0] 403, [1] 411 and [2] 407. Herein, the convention used to show address and sub-address is illustrated by the address: sub-address blocks 1:0 402, 1:1 404 and 1:2 406. In one commercial embodiment, the sub-addresses [0] 403, [1] 411 and [2] 407 can be Logical Unit Numbers (LUNs). Both the address [1] 409 and sub-addresses [0] 403, [1] 411 and [2] 407 are capable of being identified by a host computer, such as the host computer 102 of FIG. 1. As shown here, docking station [1] 408 is operatively linked with a mobile RAM device 410. The mobile RAM device 410 is designated as a device corresponding to sub-address [1] 411. Hence, address:sub-address 1:1 404 corresponds to the docking station address [1] 409 and the mobile RAM device designated sub-address [1] 411. Designating the mobile RAM device 410 to a specific virtual storage device can be accomplished by a switch system which could, for example, include a manual switch, an RF driven switch, a programmable switch, an auto switch activated by communication with a host computer, or a time based switch (such that during daytime the mobile RAM device 410 is one virtual device and at nighttime the mobile RAM device 410 is an alternative virtual device), just to name a few examples. In some embodiments, the switch system could be disposed on or in the mobile RAM device 410. In an alternative embodiment, the mobile RAM device 410 could auto switch to a particular virtual storage device activated by communication with a host computer, such as host computer 102 (i.e., the mobile RAM device 410 can configure itself as device [1] 411, for example, if an inquiry by a host computer requiring storage on a device [1] 411 is received by the cooperating docking station 408).

FIG. 4B shows a virtual docking station 412 representing the docking station 408 at address [1] 409 consistent with embodiments of the present invention. The three address:sub-address blocks 1:0 402, 1:1 404 and 1:2 406, and more specifically the sub-addresses [0] 403, [1] 411 and [2] 407, correspond to three virtual storage devices capable of storing data on three respective virtual storage medium types. As can be appreciated by a skilled artisan, two of the three virtual devices can be substantially identical virtual devices. In this example, sub-address [0] 403 from block 1:0 402 corresponds to a virtual disc drive system 414, sub-address [1] 411 from block 1:1 404 corresponds to a virtual tape drive system 416 and sub-address [2] 407 from block 1:2 406 corresponds to a virtual optical disc system 418 capable of cooperating with at least one virtual removable optical disc for storage operations. Furthermore, because the operatively linked mobile RAM device 410 is designated to correspond to sub-address [1] 411, docking station [1] 408 is adapted to be responsive to a host computer, such as host computer 102, as available for storage operations as a tape drive system 416. (The virtual disc drive system 414 and the virtual optical disc system 418 are unavailable for storage operations in this example.) A mobile RAM device, such as mobile RAM device 410, is capable of emulating a specific device for use with a media in the virtual sense. For example the virtual disc drive system 414 is adapted to store data received as random data in a random data protocol, the virtual tape drive system 416 is adapted to store data received as sequential data in a sequential data protocol, and the virtual optical disc system 418 is adapted to store data received as random data in a random data protocol and format. In one embodiment, a mobile RAM device can simply function as the mobile RAM device 410. Hence, a virtual device and virtual media can include the actual mobile RAM storage device 410 as the device capable of storing data on a media.

Figure 5A:
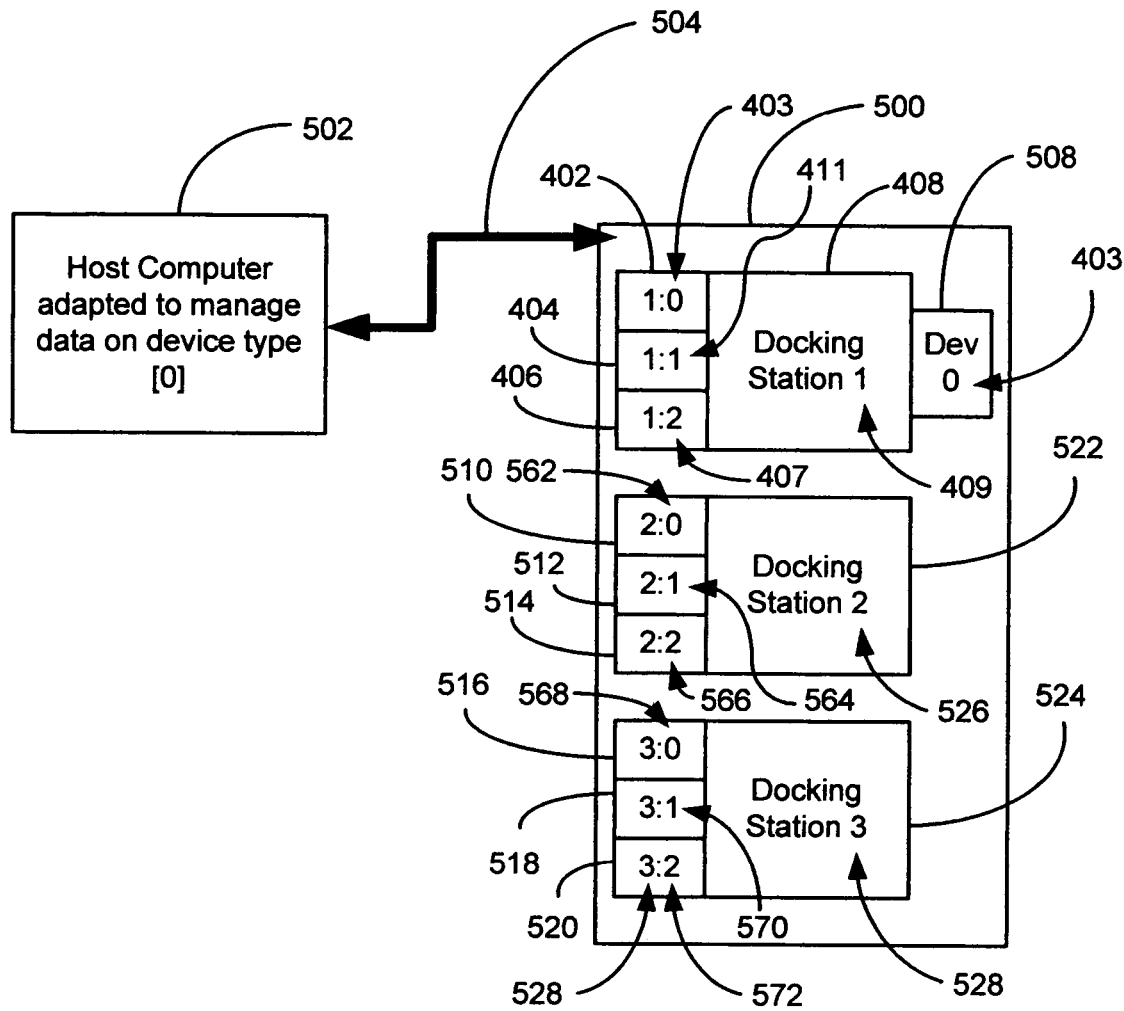
FIGS. 5A and 5B are block diagrams illustrating a host computer communicating with a storage system consistent with an embodiment of the present invention.
Figure 5B:
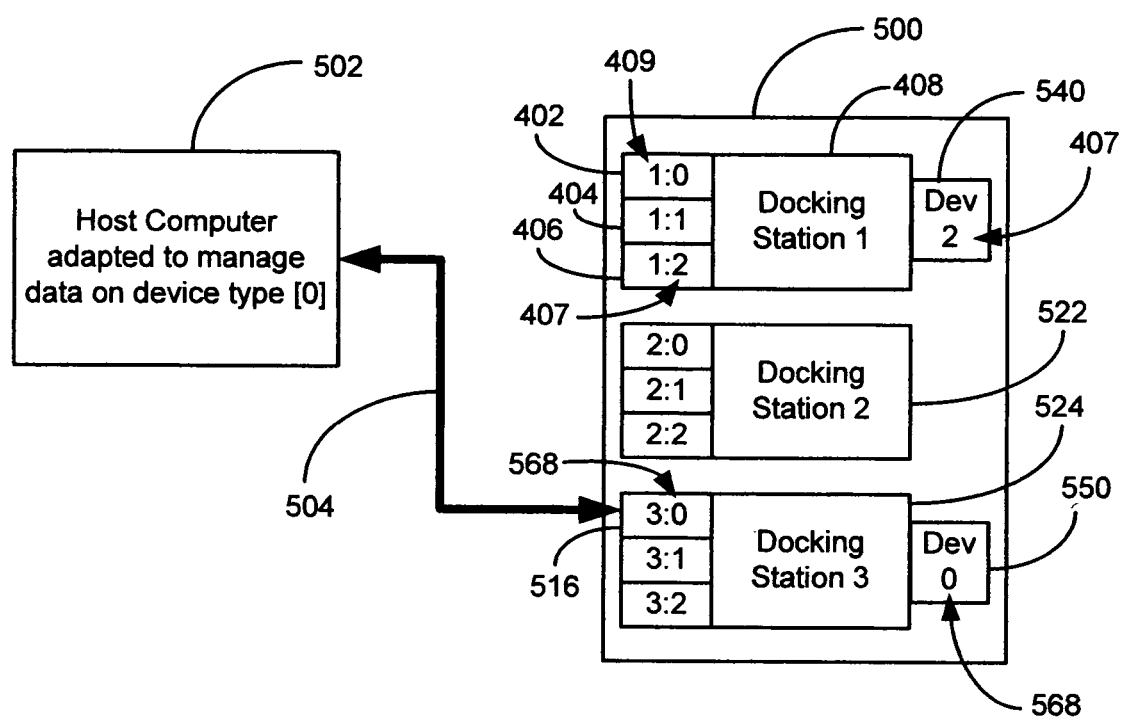

FIGS. 5A and 5B are block diagrams illustrating a host computer 502 communicating 504 with a storage system 500 consistent with an embodiment of the present invention. FIG. 5A shows the storage system 500 comprising three docking stations, docking station [1] 408, docking station [2] 522 and docking station [3] 524. Docking station [1] 408 comprises three sub-addresses [0] 403, [1] 411 and [2] 407, docking station [2] 522 comprises three sub-addresses [0] 562, [1] 564 and [2] 566 shown and docking station [3] 524 comprises three sub-addresses [0] 568, [1] 570 and [2] 572. Docking station [1] 408 is operatively linked with a mobile RAM device 508 designated as device [0] 403 corresponding to address:sub-address 1:0 402. The host computer 502 is adapted to store data on a device [0] 403 and hence is engaged with docking station [1] via the address 1:0 402 for storage operations.

FIG. 5A can be used to illustrate one embodiment of the present invention whereby the host computer 502 is adapted to manage data at a storage system 500 in a protocol used with a storage device type [0]. Following a convention similar to that used in FIG. 4B, the device for sub-address [0] 403 is a virtual disc drive 414, sub-address [1] 411 is a virtual tape drive 416 and sub-address [2] 407 is a virtual optical disc system 418. In this embodiment, the mobile RAM device 508 is designated as a virtual disc drive 414 (which as previously described could be a real disc drive) operatively linked with docking station [1] 408. The host computer 502 can transmit a Small Computer Systems Interface (SCSI) inquiry to scan the storage system's bus (not shown) to discover what devices comprise the storage system 500. An inquiry can be a host 502 or a user effectively asking the storage system 500 "who are you?" and "what are you?" The storage system 500 can show that there are three devices at address [1] 409, corresponding to docking station [1] 408; a disc drive 414 at address:sub-address 1:0 402, a tape drive system 416 at address:sub-address 1:1 404 and an optical drive system 418 at address:sub-address 1:2 406. The storage system 500 is also capable of showing that address 1:0 402 is available for storage operations and addresses 1:1 404 and 1:2 406 are not available for storage operations. In some commercial applications, this can be accomplished by transmitting a SCSI ID:LUN (corresponding to address:sub-address) response to the host 502 in 16 bytes of information. Further, the devices corresponding to the address:sub-addresses 2:0 510, 2:1 512, 2:2 514, 3:0 516, 3:1 518 and 3:2 520 of docking stations [2] 522 and [3] 524 respectively will all register as unavailable to the host computer 502 because there are no mobile RAM devices 114 operatively linked with the docking stations [2] 522 and [3] 524. The host computer 502 (adapted to store data on a disc drive for example) determining that a disc drive at address 1:0 402 is available for storage can commence storage operations 504 with docking station [1] 408 and the mobile RAM device 508.

FIG. 5B shows an alternate embodiment of the present invention of the host computer 502 performing storage operations via docking station [3] 524. In this embodiment a first mobile RAM device 540 is operatively linked with docking station [1] 408 of the storage system 500 and a second mobile RAM device 550 is operatively linked with docking station [3] 524 of the storage system 500. The host computer 502 is adapted to perform storage operations with a device type [0]. Through inquiries, the host computer 502 can discover that address:sub-address 1:2 of docking station [1] 408, is available for data storage on a device type [2] because mobile RAM device 540 is designated to be a device type [2] 407. The host computer 502 can further discover that all of the addresses associated with docking station [2] 522 are unavailable (because there is no operatively linked mobile RAM device and hence no recording medium for docking station [2] 522 to perform mass storage operations). Docking station [3] 524 is operatively linked with the second mobile RAM device 550 configured with the designation of device [0] 568. The host computer 502, adapted to store data on a device type [0], is engaged in storage operations 504 with docking station [3] 524 because the associated address:sub-address 3:0 516 can be positively identified as available for storage operations as a device and media type [0].

As is understood by one skilled in the art, a host computer, such as the host computer 502, generally communicates and stores data in protocol that may be different for alternative devices and media. For example, a tape library protocol includes both a streaming protocol to store data in a linear fashion tailored for tape medium and a media changer protocol adapted to load tape cassettes in tape drives. In the event a docking station, such as docking station [1] 408, positively indicates availability for data storage at a tape drive, such as at address:sub-address 1:1 404 for example, the docking station may be adapted to be responsive to instructions as if it were a tape library ready for data storage.

In one embodiment of the present invention, a library could be configured to support both docking stations, such as docking station [3] 524, for use with a mobile RAM device, such as the second mobile RAM device 550, and at least one tape drive adapted to store data on tape cassettes. An example of such a hybrid library supporting storage on both real tape cassettes and virtual tape cassettes is the Spectra Logic T950 library.

Figure 6:
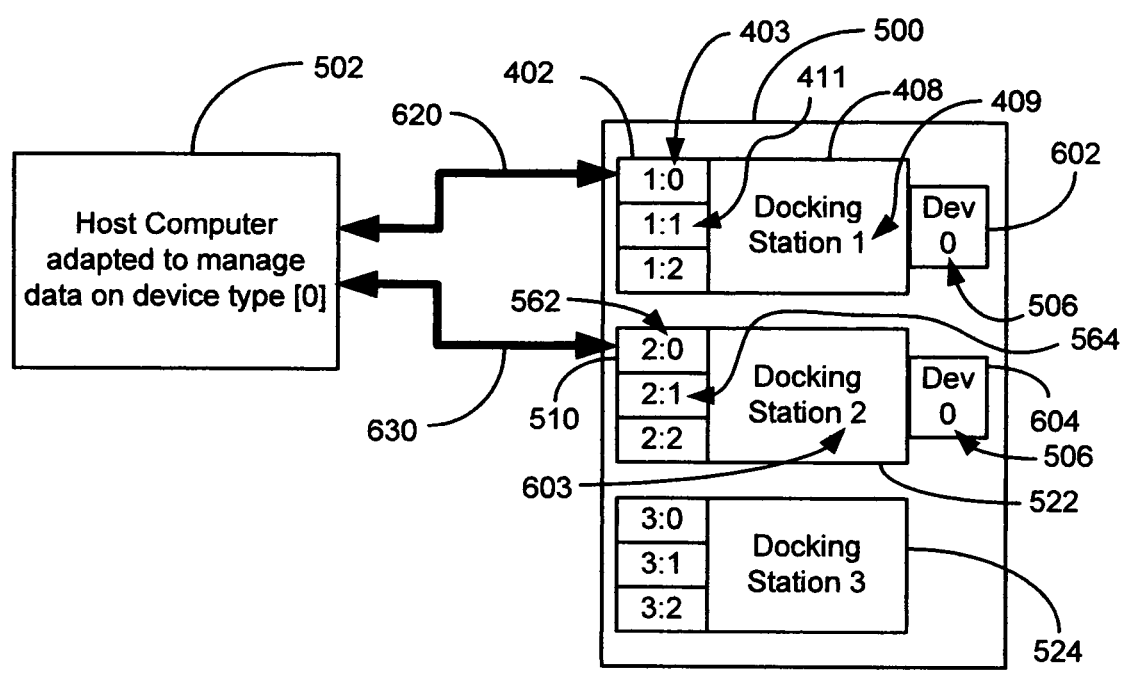
FIG. 6 is an alternative embodiment showing two docking stations receiving and responding to storage operations from a host computer at substantially the same time consistent with an embodiment of the present invention.

FIG. 6 is yet another alternative embodiment showing two docking stations receiving and responding to storage operations from a host computer 502 at substantially the same time. Docking station [1] 408 is operatively linked with a first mobile RAM device 602 and docking station [2] 522 is operatively linked with a second mobile RAM device 604. Both the first 602 and second 604 mobile RAM devices are designated to be device type [0] 506. Both docking stations [1] 408 and [2] 522 are responsive to the host computer 502 as being available to receive data for storing at address:sub-address 1:0 402 and address:sub-address 2:0 510 both as storage device type [0] able to store data on media type [0]. The host computer 502, adapted to manage data on device type [0], is shown here performing storage operations 620 and 630 via both docking station [1] 408 and docking station [2], respectively. Docking station [3] 524 does not have a cooperating mobile RAM device 114 and hence registers as unavailable for storage operations.

Figure 7:
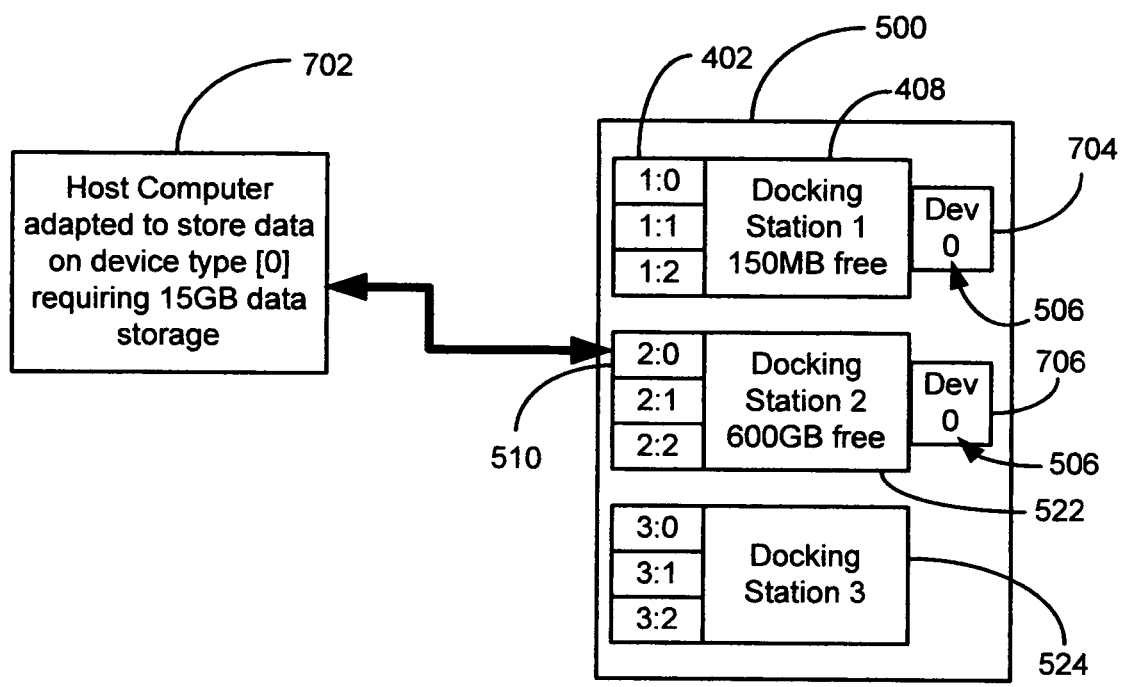
FIG. 7 is an alternative embodiment of the present invention illustrating docking station responsiveness based on available storage space consistent with an embodiment of the present invention.

FIG. 7 is an alternative embodiment of the present invention illustrating docking station responsiveness based on available storage space. Herein, docking station [1] 408 is operatively linked with a first mobile RAM device 704 and docking station [2] 522 is operatively linked with a second mobile RAM device 706. Both the first 704 and second 704 mobile RAM devices are designated to be device type [0] 506. In this embodiment, the host computer 702 requires storage of 15 GB of data on a device type [0]. Docking station [1] 408 is identified as only capable of receiving 150 MB of data for storage on device type [0] at address:sub-address 1:0 402. Docking station [2] 522 is identified as capable of receiving up to 600 GB of data for storage on device type [0] 506 at address:sub-address 2:0 510. Hence, the host computer 702 engages in storage operations via docking station [2] 522 at address 2:0 510.

Figure 8:
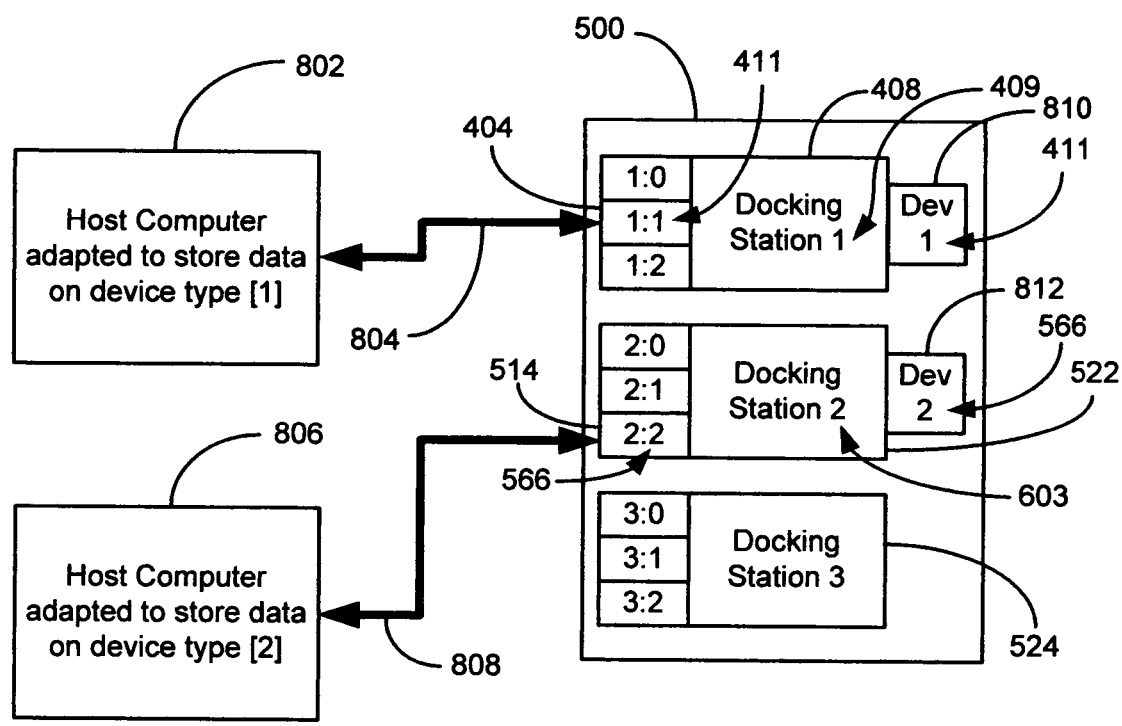
FIG. 8 shows two different host computers performing storage operations with a storage system at substantially the same time consistent with some embodiments of the present invention.

FIG. 8 shows two different host computers 802 and 806 performing storage operations with the storage system 500 at substantially the same time consistent with some embodiments of the present invention. Herein, docking station [1] 408 is operatively linked with a first mobile RAM device 810 and docking station [2] 522 is operatively linked with a second mobile RAM device 812. Docking station [1] 408 is available for storage operations at address:sub-address 1:1 404 because the cooperating first mobile RAM device 810 is designated as device [1] 411 adapted to store data on media type [1] 411. Docking station [2] 522 is available for storage operations at address:sub-address 2:2 514 because the cooperating second mobile RAM device 812 is designated as device [2] 566 adapted to store data on media type [2] 566. As shown herein, a first host computer 802 adapted to store data on a storage device type [1] is engaged 804 with docking station [1] 408 for data storage operations at address 1:1 404. A second host computer 806 adapted to store data on a storage device type [2] is engaged 808 with docking station [2] 522 for data storage operations at address 2:2 514. Docking station [3] 524 does not have a cooperating mobile RAM device 114 and hence registers as unavailable for storage operations.

Figure 9:
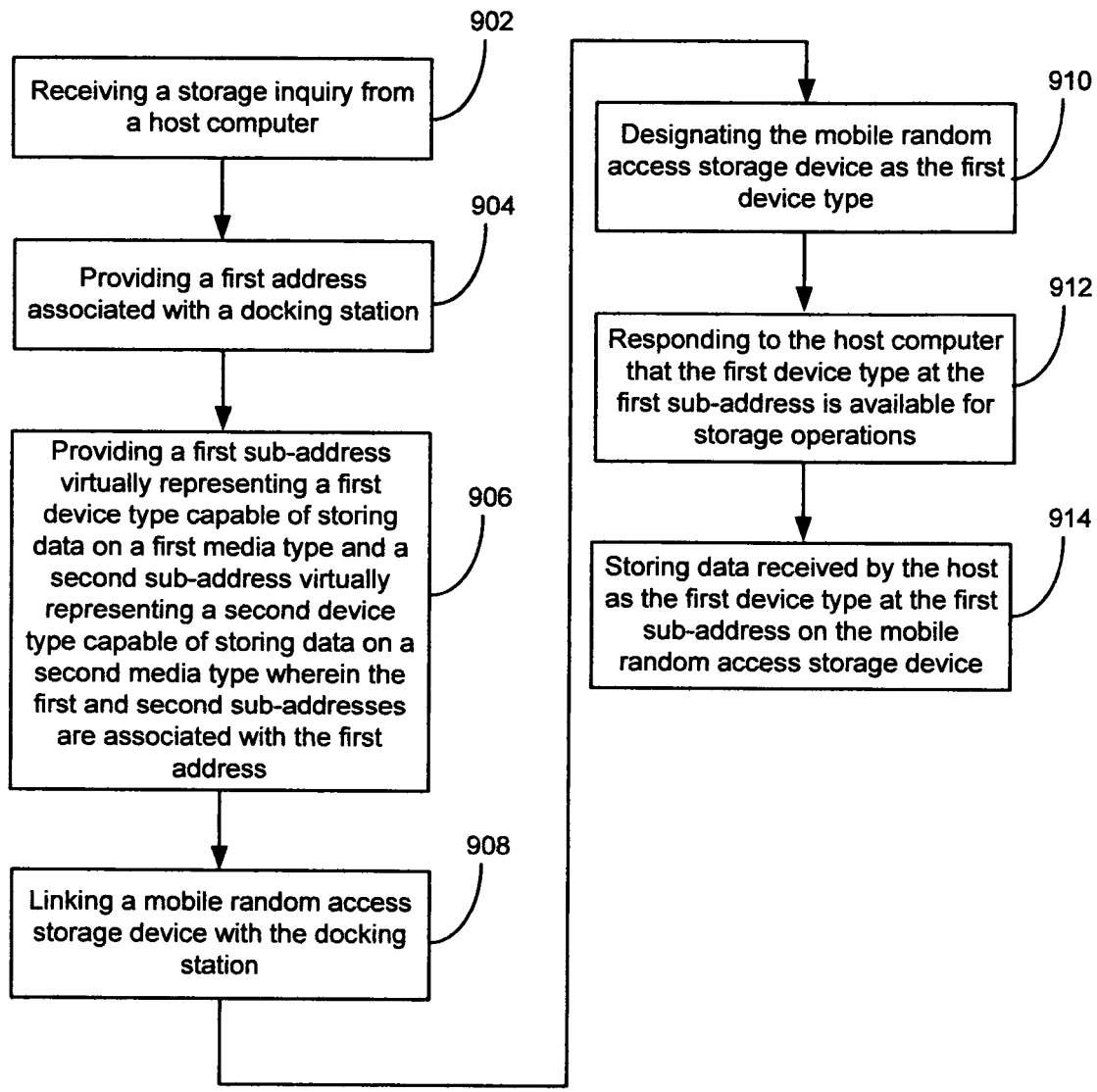
FIG. 9 shows a method to practice an embodiment of the present invention.

Referring now to FIG. 9, shown therein is a method to practice an embodiment of the present invention. It should be recognized that the steps presented in the described embodiments of the present invention do not necessarily require any particular sequence. Similar elements are used from FIG. 5A for purposes of illustration in this embodiment. In step 902, a storage system 500 receives an inquiry from a host computer 502. Means for receiving the inquiry can be over a SCSI or fiber channel connection, for example. In step 904, a first address [1] 409 associated with a docking station [1] 408 is provided. The first address [1] 409 can be optically transmitted over the same path over which the inquiry was received, for example. In step 906, a first sub-address [0] 403 corresponding to a first virtual device, such as a disc drive 414, capable of storing data on a first media, such as a magnetic hard disc, is provided. In addition, a second sub-address [1] 411 corresponding to a second virtual device, such as a tape drive 416, capable of storing data on a second media, such as a cassette, is also provided. The first [0] 403 and second [1] 411 sub-addresses are associated with the first address [1] 409 in the relationship of address:sub-address as shown by blocks 1:0 402 and 1:1 404 respectively. A means for providing the first sub-address [0] 403 and second sub-address [1] 411 can be by transmitting the addresses [0] 403 and [1] 411 associated with address [1] 409 via the same path over which the inquiry was received. In one commercially used SCSI protocol, both the address and sub-address are transmitted to the host computer 502 as a 16 byte data package as address:sub-address, such as 1:0 402 for example. In step 908, a mobile RAM device 508 is linked with the docking station [1] 408. A means for linking the mobile RAM device 508 with the docking station [1] 408 could be by wire line, wireless, or simply by inserting a mobile RAM device into the docking station [1] 408 whereby electrical connections electrically link the docking station [1] 408 and the mobile RAM device 508, just to name a few examples. In step 910, the mobile RAM device 508 is designated as the first virtual device [0] 403. A means for designating the RAM device 508 as the first virtual device [0] 403 can be accomplished by a switch system, for example, which could further include a manual switch, an RF driven switch, a programmable switch, or a time based switch (i.e., during day time the mobile RAM device 410 is one device and at night time the mobile RAM device 410 is an alternative device), just to name a few examples. A means for designating the RAM device 508 can further include an auto switch activated by communication with the host computer 502. For example, the mobile RAM device 508 may configure itself as device [0] 403 given an inquiry by the host computer 502 is by way of a protocol supporting device [0] 403. In step 912, the host computer 502 is transmitted a response indicating that the virtual device [0] 403 at sub-address [0] 403 is available for storage operations. A means for responding to the host computer 502 that the first virtual device [0] 403 at sub-address [0] 403 is available for storage operations could by transmitting the information over the same path that the inquiry was received over. As one skilled in the art will appreciate, other communication and instruction steps may occur between the inquiry step 902 and the responding step 912. In step 914, data received from the host computer 502 is stored at the first sub-address [0] 403 which is on the mobile RAM device 508. A means for storing data received from the host computer 502 at the first sub-address [0] 403 on the mobile RAM device 508 can be accomplished by a data conversion program capable of converting data received in a protocol by the host computer 502 to data storable on the mobile RAM device 508 such as can be written by or for an OEM, for example. Another means can be accomplished by a data conversion processor chip which can be designed by or for an OEM, for example.

Figure 10:
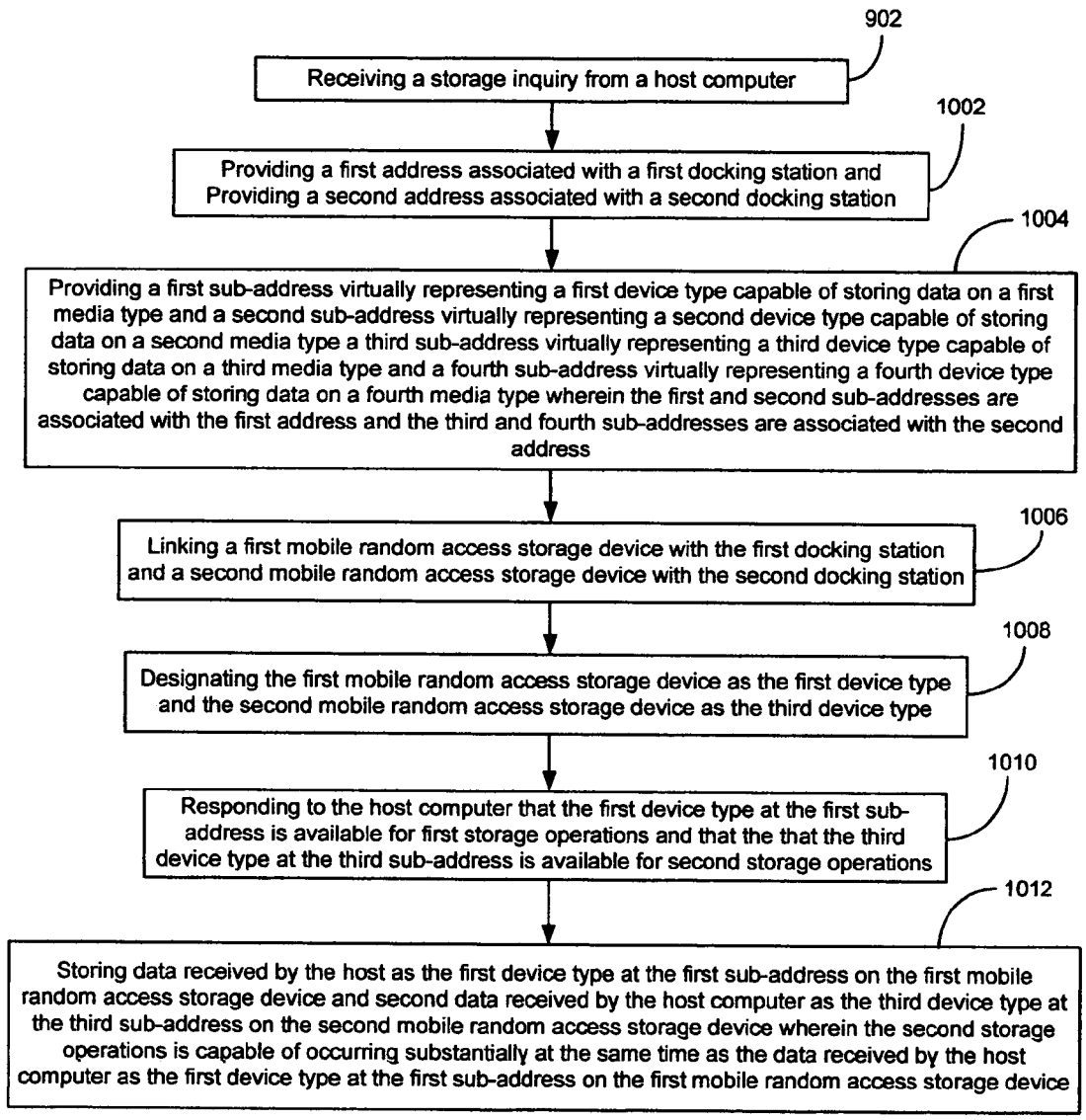
FIG. 10 shows an alternative method consistent with some embodiments of the present invention which includes a method step from FIG. 9.

FIG. 10 shows an alternative method consistent with some embodiments of the present invention and includes method step 902 from FIG. 9. Similar elements are used from FIG. 6 for purposes of illustration in this embodiment. In step 1002, a first address [1] 409 associated with a first docking station [1] 408 and a second address [2] 603 associated with a second docking station [2] 522 are provided. In step 1004, a first sub-address [0] 403 corresponding to a first virtual device, such as a disc drive, capable of storing data on a first media, such as a magnetic hard disc, a second sub-address [1] 411 corresponding to a second virtual device, such as a tape drive, capable of storing data on a second media, such as a cassette, a third sub-address [0] 562 corresponding to a third virtual device, such as a second disc dive, capable of storing data on a third media, such as second disc, and a fourth sub-address [1] 564 corresponding to a fourth virtual device, such as second tape drive, capable of storing data on a fourth media, such as second cassette are provided. The first [0] 403 and second [1] 411 sub-addresses are associated with the first address [1] 409 and the third [0] 562 and fourth [1] 564 sub-addresses are associated with the second address [2] 603. In step 1006, a first mobile RAM device 602 is linked with the first docking station [1] 408 and a second mobile RAM device 604 is linked with the second docking station [2] 522. In step 1008, the first mobile RAM device 602 is designated as the first virtual device, which is storage device type [0] 506, and the second mobile RAM device 604 is designated as the third virtual device, also [0] 506 in this embodiment. One skilled in the art will appreciate that the third virtual device can be a device different than storage device type [0] 506 without departing from the scope and spirit of the invention. In step 1010, the host computer 502 receives a response that the first virtual device [0] 506 at the first sub-address [0] 403 is available for first storage operations 620 and that the third virtual device [0] 506 at the third sub-address [0] 562 is available for second storage operations 630. In step 1012, first data is received 620 from the host computer 502 at the first sub-address [0] 403 on the first mobile RAM device 602 and second data is received 630 from the host computer 502 at the third sub-address [0] 562 on the second mobile RAM device 604 wherein the second storage operations 630 is capable of occurring substantially at the same time as the first storage operations 620.

Figure 11:
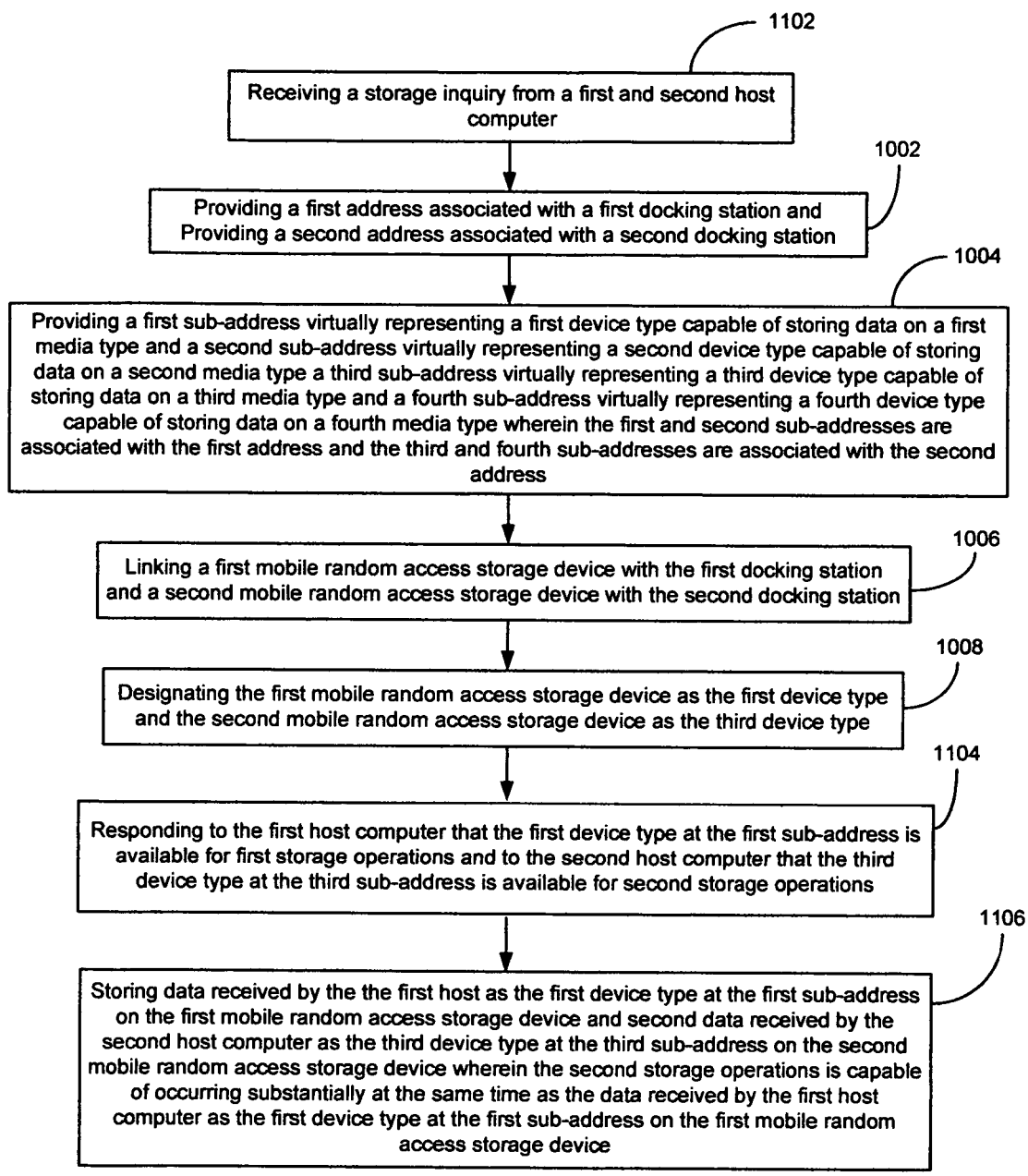
FIG. 11 shows an alternative method consistent with some embodiments of the present invention which includes some method steps from FIG. 10.

FIG. 11 shows an alternative method consistent with some embodiments of the present invention which includes method steps 1002, 1004, 1006 and 1008 from FIG. 10. Similar elements are used from FIG. 8 for purposes of illustration in this embodiment. In step 1102, storage inquiries are received from a first host computer 802 and a second host computer 806. The first host computer 802 is adapted to manage data on a device [1] 411 and the second host computer 806 is adapted to manage data on a device [2] 566. In step 1104, the first host computer 802 receives a response that a first virtual device [1] 411 at the first sub-address [1] 411 is available for first storage operations 804 and the second host computer 806 receives a response that a third virtual device [2] 566 at the third sub-address [2] 566 is available for second storage operations. In step 1106, data is received 804 from the first host 802 (for the first virtual device [1] 411) at the first sub-address [1] 411 on the first mobile RAM device 810 and second data is received 808 from the second host computer 806 (for the third virtual device [2] 566) at the third sub-address [2] 566 on the second mobile RAM device 812 wherein the second storage operations 808 are capable of occurring substantially at the same time as the first storage operations 808.

Figure 12A:
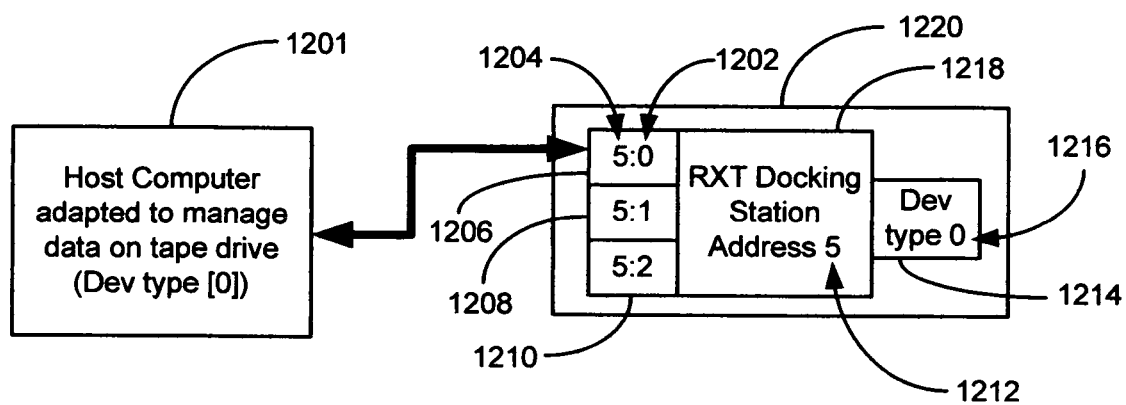
FIGS. 12A and 12B are block diagrams illustrating embodiments wherein the present invention can be commercially practiced.
Figure 12B:
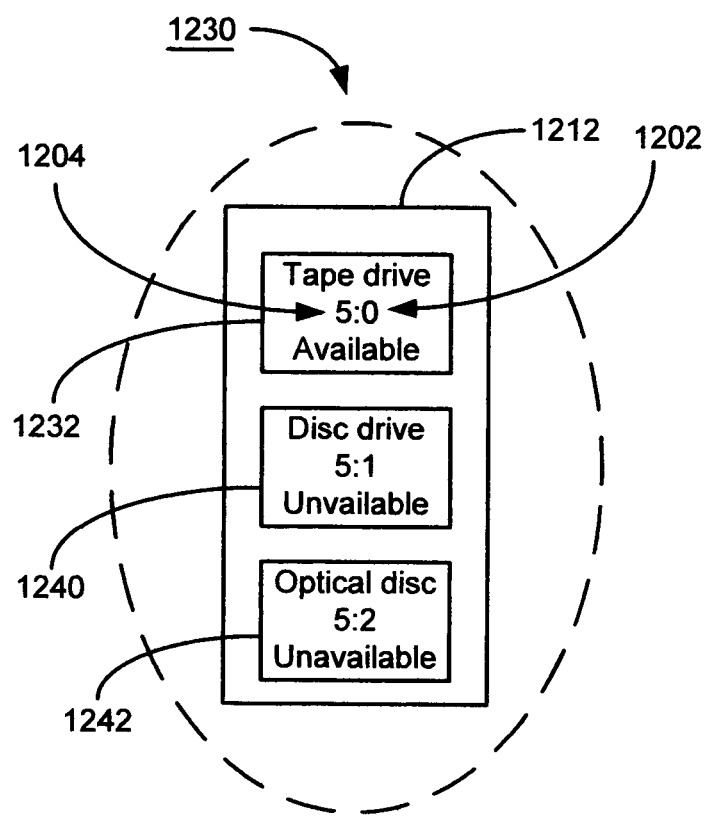

As shown earlier, embodiments of the present invention can be commercially practiced, for example, with a Spectra Logic RXT Bank of Drives storage system 200 of FIG. 2, performing as a storage system 106, for use with RXT disc drive magazines 201. The RXT can comprise one or more RXT docking stations 202 adapted to cooperate with an RXT disc drive magazine 201. As previously described, an RXT disc drive magazine 201 encases a plurality of disc drives, such as 308, which can be provided by Seagate Corporation of Scotts Valley, Calif. As shown in FIG. 12A, a host computer 1201 is capable of initiating commands to communicate with the RXT storage system 200. In one exemplary embodiment, an RXT library 1220 comprises one RXT docking station 1218 that is operatively linked with an RXT disc drive magazine 1214 wherein the RXT disc drive magazine 1216 is designated as a tape device 1216. In this embodiment, designation of a tape drive device 1216 is accomplished with a manual switch (not shown) disposed on the RXT magazine 201. The host computer 1201 will poll the library's 1220 SCSI bus (not shown) searching for devices, in this case the RXT docking station 1218. The host computer 1201 will poll the sub-addresses, or LUNs (such as LUN [0] 1202), of the address (such as address [5] 1212) corresponding to the one RXT docking station 1218 (in the case of multiple addresses, all the addresses may be polled for sub-addresses). FIG. 12B shows a dashed oval 1230 containing virtual devices 1232, 1240 and 1242 at address [5] 1212 associated with the docking station 1218. The virtual devices 1232, 1240 and 1242 include a tape device 1232 with a corresponding SCSI address 5 1204, LUN 0 1202 (5:0) 1206, a disc drive device 5:1 1240 and an optical disc device 5:2 1242.

The tape device 1232, disc drive device 1240 and optical disc device 1242 are all at the same address [5] 1204, however, each have a unique LUN, such as LUN [0] 1202. The host 1201 may either create device files or may already have device files associated with each of the virtual devices 1232, 1240 and 1242. When Veritas software, provided by Symantec Corporation of Cupertino, Calif., is used for communication with the docking station 1218, host level device files are used to "talk" to the docking station 1218. In one embodiment, the Veritas software will send a SCSI Inquiry command to the virtual drive devices 1232, 1240 and 1242 to obtain vendor and product identification. The host computer 1201 will then send a mode sense command to obtain geometry corresponding to each virtual device 1232, 1240 and 1242 (as emulated by the docking station 1218). Geometry can be the configuration of a virtual system corresponding to each virtual drive device 1232, 1240 and 1242. Using the geometry information, the Veritas software can issue commands such as "Read Element Status" to obtain inventory information, such as availability for storage operations. Upon issuing a "Read Element Status", each virtual drive device 1232, 1240 and 1242 will return all necessary information for storage operations, such as inventory information, for example. The Veritas software can then "talk" to the tape device 1232 at 5:0 1206, disc drive device 1240 5:1 1206, and optical disc device 1242 5:2 1210 to obtain individual inventory by using a "Test Ready Command". Because the docking station 1218 is operatively linked with an RXT disc drive magazine 1214 and the RXT disc drive magazine 1218 is designated device [0] 1216 which corresponds to the virtual tape device 1216, a Test Unit Ready command is returned to the host computer 1201 indicating that the tape drive 1232 located at 5:0 1206 is loaded with a cassette and available to perform storage operations. The Test Unit Ready command will indicate that the disc drive device 1240 at 5:1 1208 and the optical disc device 1242 at 5:2 1210 are unavailable for storage operations.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, as described in FIG. 5A, though communication between a host computer 502 and the docking station [1] 408 generally conforms with SCSI protocol, the order and initiation of communication can vary depending on the protocol used, such as fiber channel for example, while still maintaining substantially the same functionality without departing from the scope and spirit of the present invention. Further, though communication is described herein as between the host computer 502 and the docking stations, such as docking station [1] 408, communication can be received by the storage system 500 and channeled to the docking stations without departing from the scope and spirit of the present invention. Finally, although the preferred embodiments described herein are directed to disc drive systems, such as the disc drive magazine 201, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage system comprising:
   a docking station identifiable to a consumer of data as a target storage device via an address, the docking station further identifiable to the consumer of data as a first type of storage device via a first sub-address and a second type of storage device via a second sub-address;
   a first mobile storage device, that is a random access device, switched to be designated as the first type of storage device, the first mobile storage device forming a linked relationship with the docking station upon being at least partially received by an opening in the docking station, wherein when linked, the docking station and first mobile storage device are capable of performing storage operations and the consumer of data recognizes the docking station as available for storing data as the first type of storage device.

2. The storage system of claim 1 wherein the designation of the first mobile storage device is changed to correspond to the second type of storage device whereupon the consumer of data recognizes the docking station as the target storage device available for storing data as the second type of storage device when the docking station is linked with the first mobile storage device.

3. The storage system of claim 1 wherein the second type of storage device is a different kind of storage device from the first type of storage device.

4. The storage system of claim 1 wherein the first mobile storage device is physically replaced by a second mobile storage device designated to correspond to the second type of storage device, wherein upon forming a linked relationship with the docking station, the second mobile storage device influences the docking station to be recognized by the consumer of data as the target storage device capable of storing data as a second type of storage device.

5. The storage system of claim 1 wherein the first mobile storage is designated to correspond to the first type of storage device via one of the group consisting of: a manual switch, RF driven switch, programmable switch, auto switch activated by communication with the consumer of data, and time based switch.

6. The storage system of claim 1 wherein the first mobile storage device is selected from the group of random access storage devices consisting of: flash memory device adapted for mobility, magnetic disc drive adapted for mobility, disc drive magazine adapted for mobility, optical media drive adapted for mobility, magneto-optical drive adapted for mobility, and floppy disc drive adapted for mobility.

7. The storage system of claim 1 wherein the first sub-address corresponds to a virtual tape drive and virtual tape cassette adapted to cooperate with the virtual tape drive and the second sub-address corresponds to a virtual disc drive.

8. The storage system of claim 1 further comprising a second docking station identified to a consumer of data via a second address and a first docking station associated with a first address, the first docking station adapted to receive the first data for storage on the first mobile random access storage device while the second docking station receives second data for storage on a second mobile random access storage device from the at least one consumer of data.

9. The storage system of claim 1 wherein the docking station further comprises a third sub-address associated with the docking station; the third sub-address corresponding to a second type of storage device that is different from the first type of storage device.

10. The storage system of claim 1 wherein the first mobile storage device is designated to correspond to the first type of storage device by way of a manual switch disposed in an operator accessible location on the first mobile storage device.

11. The storage system of claim 1 wherein the designation from the first mobile storage device is changed to correspond to the second type of storage device when the first mobile storage device is not at least partially received by the opening in the docking station and, therefore, not linked with the docking station.

12. The storage system of claim 1 wherein the designation from the first mobile storage device is changed to correspond to the second type of storage device when the first mobile storage device is at least partially received by the opening in the docking station and linked with the docking station.

13. A method for saving information in a storage system comprising:
    receiving an inquiry from a first consumer of data;
    providing a first address, first sub-address and second sub-address associated with a first docking station wherein the first sub-address corresponds to a first virtual device and the second sub-address corresponds to a second virtual device;
    designating a first mobile random access storage device as the first virtual device;
    moving the first mobile random access storage device at least partially into a receiving opening in the first docking station to operatively link the first mobile random access storage device with the first docking station;
    influencing the first docking station to be identifiable as the first virtual device available for storage operations based on the designation step when operatively linked with the first mobile random access storage device;
    responding to the consumer of data that the first virtual device at the first sub-address is available for storing first data; and
    storing the first data received from the first consumer of data at the first address and first sub-address to the first mobile random access storage device.

14. The method of claim 13 wherein the designating step is accomplished with a manual switch, RF driven switch, programmable switch, auto switch activated by communication with the first consumer of data, and time based switch.

15. The method of claim 13 wherein the designating step is accomplished with a manual switch disposed in an operator accessible position on the first mobile random access storage device.

16. The method of claim 13 wherein the designating step occurs before the moving step, the moving step occurs before the influencing step, the influencing step occurs before the responding step, the responding step occurs before the responding step, and the responding step occurs before the storing step.

17. The method of claim 13 the designating step occurs after the moving step.

18. The method of claim 13 further comprising:
    providing a second address associated with a second docking station wherein the second docking station is further identifiable via a third sub-address corresponding to a third virtual storage device;
    designating a second mobile random access storage device as the third virtual storage device;
    moving the second mobile random access storage device at least partially into a receiving opening in the second docking station to operatively link the second mobile random access storage device with the second docking station;
    influencing the second docking station to be identifiable as the third virtual storage device available for storage operations, based on the designation step, when operatively linked with the second mobile random access storage device;
    responding to the consumer of data that the third virtual storage device at the third sub-address is available for storing second data; and
    storing the second data received from the second consumer of data at the second address and third sub-address on the second mobile random access storage device.

19. A system for saving information in a storage library comprising:
- means for receiving an inquiry from a first consumer of data;
- means for providing a first address and first and second sub-addresses associated with a first docking station;
- means for designating a first mobile random access storage device as a first virtual device;
- moving the first mobile random access storage device at least partially into a receiving opening in the first docking station to operatively link the first mobile random access storage device with the first docking station;
- means for influencing the first docking station to be identifiable as the first virtual device available for storage operations based on the means for designating when operatively linked with the first mobile random access storage device;
- means for responding to the consumer of data that the first virtual device at the first sub-address is available for storing first data; and
- means for storing the first data received from the first consumer of data at the first address and first sub-address on the first mobile random access storage device.

20. The system of claim 19 further comprising means for switching the first mobile random access storage device to a second virtual device wherein the second virtual device is a different type of storage device from the first virtual device.

21. The system of claim 19 further comprising a plurality of docking stations that are each adapted to receive one of a plurality of mobile random access storage devices all of which are housed within the storage library.

* * * * *